Figure 1:
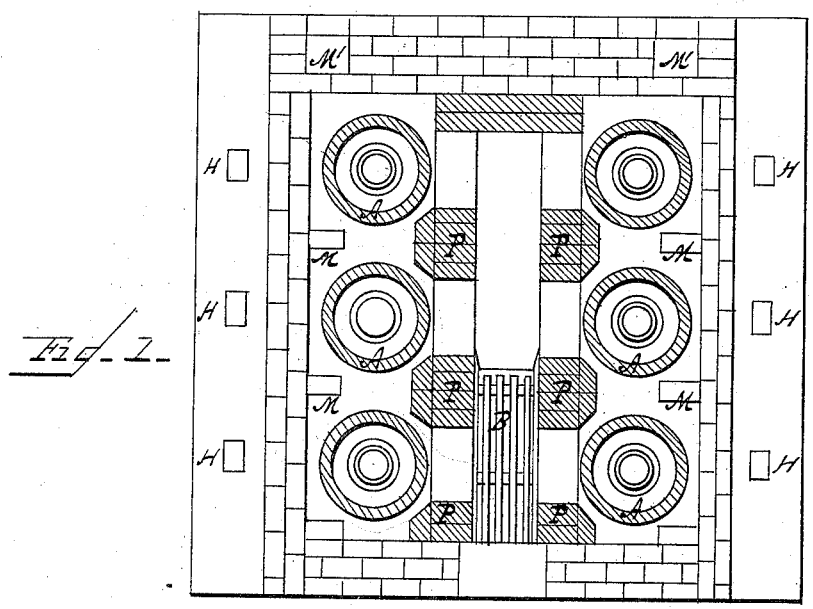

(No Model.) 4 Sheets—Sheet 1.

G. W. HARRIS & A. L. ALLEN.
APPARATUS FOR THE MANUFACTURE OF GAS.

No. 302,909. Patented Aug. 5, 1884.

WITNESSES
Franck L. Ourand
H. B. Moulton

INVENTOR
George W. Harris
Augustus L. Allen
by F. W. Ritter Jr.
Attorney (No Model.) 4 Sheets—Sheet 2.
G. W. HARRIS & A. L. ALLEN.
APPARATUS FOR THE MANUFACTURE OF GAS.
No. 302,909. Patented Aug. 5, 1884.
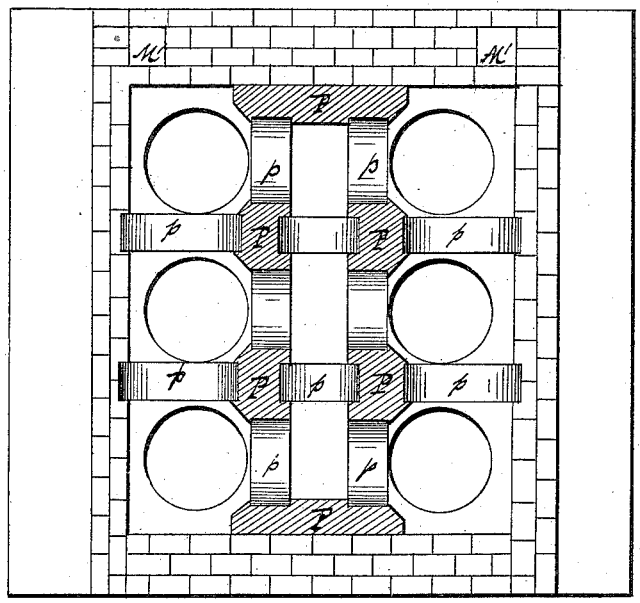
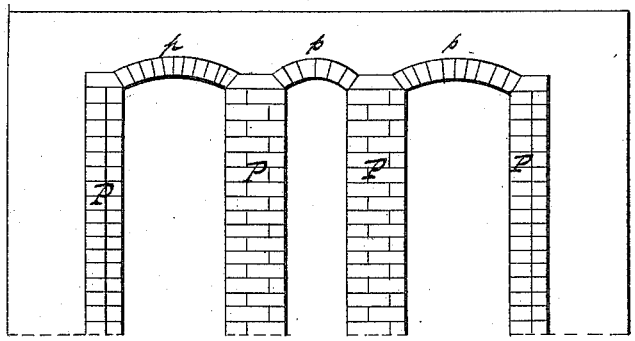
WITNESSES
Franck L. Ouraud
J. B. Moulton
INVENTOR
George W. Harris
Augustus L. Allen
by F. W. Ritter Jr
Attorney (No Model.) 4 Sheets—Sheet 3.
G. W. HARRIS & A. L. ALLEN.
APPARATUS FOR THE MANUFACTURE OF GAS.
No. 302,909. Patented Aug. 5, 1884.
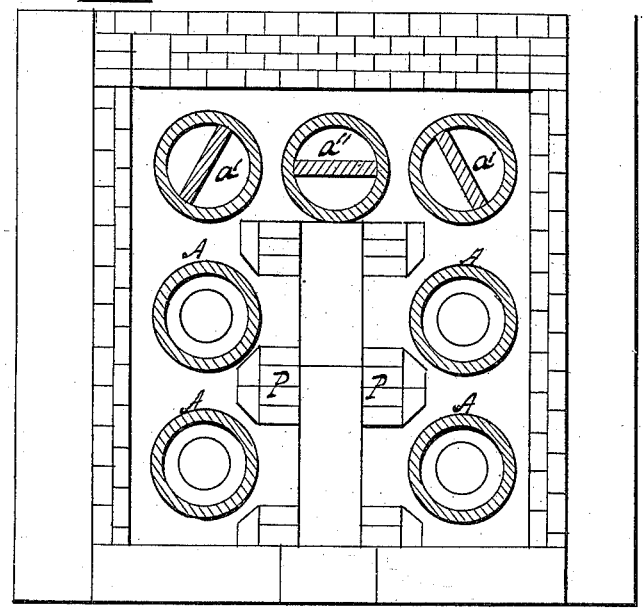
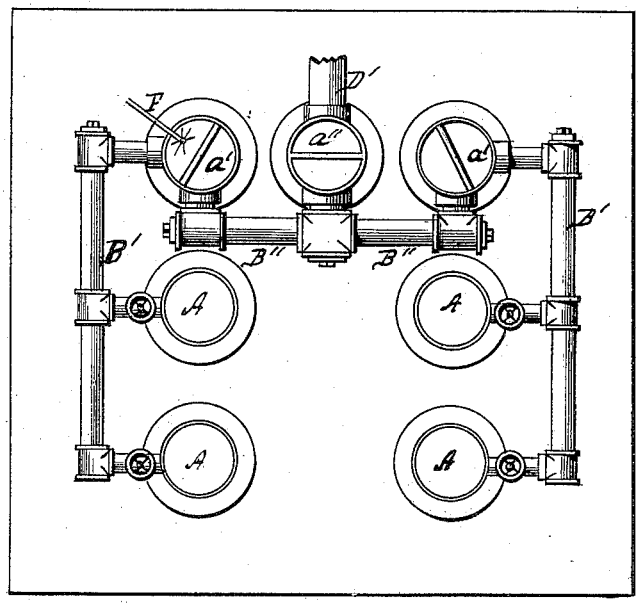
WITNESSES
INVENTOR
George W. Harris
Augustus L. Allen
by F. W. Ritter Jr.
Attorney (No Model.) 4 Sheets—Sheet 4.
G. W. HARRIS & A. L. ALLEN.
APPARATUS FOR THE MANUFACTURE OF GAS.
No. 302,909. Patented Aug. 5, 1884.
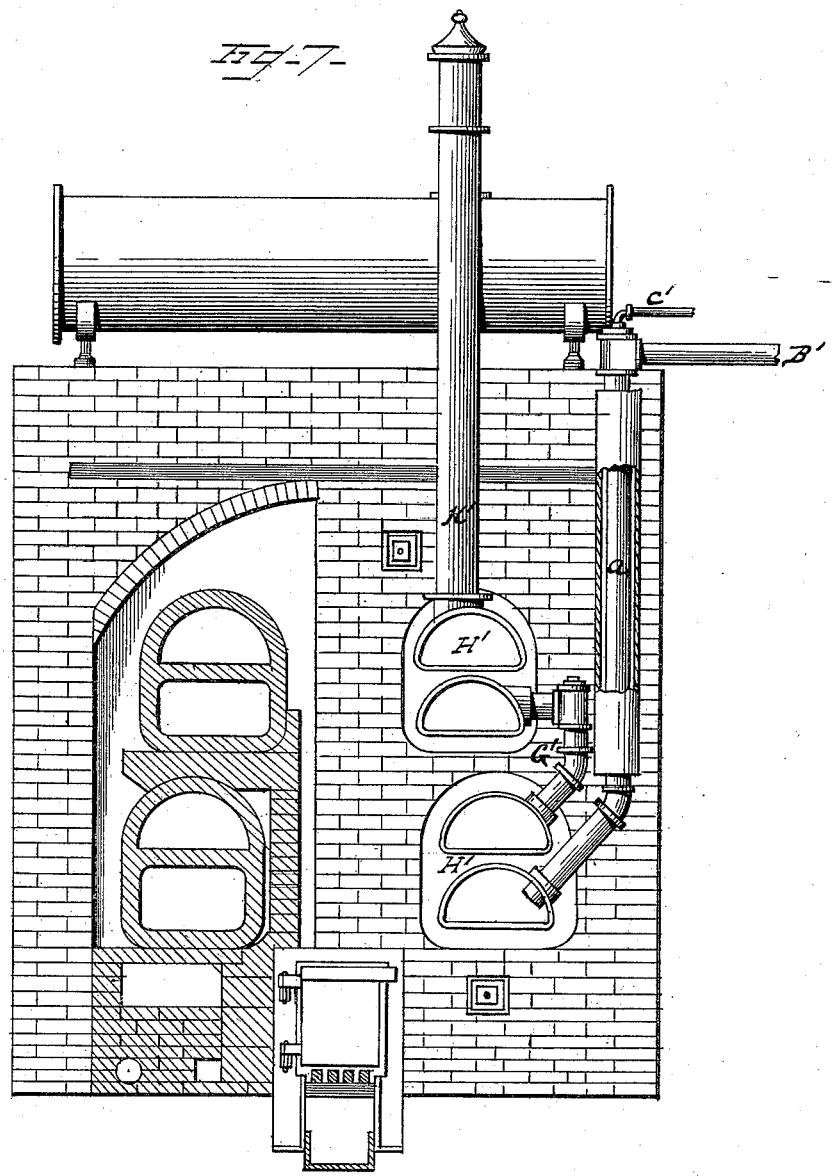

UNITED STATES PATENT OFFICE.

GEORGE W. HARRIS AND AUGUSTUS L. ALLEN, OF POUGHKEEPSIE, N. Y.

APPARATUS FOR THE MANUFACTURE OF GAS.

SPECIFICATION forming part of Letters Patent No. 302,909, dated August 5, 1884.

Application filed January 3, 1884. (No model.)

*To all whom it may concern:*

Be it known that we, GEORGE W. HARRIS and AUGUSTUS L. ALLEN, of Poughkeepsie, in the county of Dutchess and State of New York, have invented certain new and useful Improvements in Apparatus for the Manufacture of Gas, which improvements are fully set forth in the following specification and accompanying drawings.

This invention relates to certain improvements in the manufacture of gas for heating and illuminating purposes and apparatus therefor; and it is particularly designed to be employed in connection with what is known as the "Allen-Harris or American hydrocarbon process for manufacturing gas," in which the gas is produced by the decomposition of water by means of highly-heated carbon, and afterward enriched by distilling with it rich bituminous coals, petroleum, naphtha, or other hydrocarbons in order to secure the necessary illuminating properties, and at the same time to increase its volume.

Our present invention seeks to obviate many objectionable features which exist in the apparatus at present in use, and as far as possible to perfect the apparatus by which the Allen-Harris and kindred processes are carried out. Owing to the intense and frequently unequal or varying heat to which the superheaters, retorts, and other portions of the apparatus is subjected, constant repairs are necessary, and as such devices are now constructed and arranged the working of the furnace is arrested, and frequently large portions of the brick-work have to be removed in order to facilitate repairs. One object we have in view is so to combine a series of vertical retorts in a fire-chamber heated by a single fire that any one of the retorts or superheaters and its adjuncts may be repaired or replaced without disturbing the other retorts of the series; and a second object we have in view is the perfection of a series of vertical retorts and their arrangement in a system within a single furnace, whereby the entire process of decomposition and carbureting the water-gas may be conveniently conducted in vertical retorts.

To this end the first point of our invention consists in combining with the vertical retort a detachable horizontal mouth-piece or base-section, so that the vertical retort or the mouth-piece—either or both—can be withdrawn and replaced without materially disturbing the brick-work of the furnace.

The second point consists in combining with the vertical retort a detachable perforated dished annular tile, which serves to direct the ashes, &c., from the vertical retort into the horizontal base or mouth piece, and also to form a steam-channel in the base of the retort.

The third point of the invention consists in the arrangement within the furnace of a series of pillars as supports for independent arches, which pillars also serve as heat-storers and to deflect the products of combustion and cause them to envelop the vertical retorts uniformly.

The fourth point of the invention consists in so arranging a series of detachable superheaters on suitable supports over the fire-chamber and between the pillars or supports of the arch that they will be subjected to a high heat, will not impede the draft of the furnace or oven, and may be removed or replaced with little disturbance of the furnace-walls.

The fifth point of the invention consists in combining with the decomposing-retorts a series of vertical carbureting-retorts having vertical diaphragms or septums, and a spray-nozzle for delivering hydrocarbons to one or more of the retorts; and, finally, in certain combinations and details of construction, which will hereinafter more fully appear.

We will now proceed to describe our invention more specifically, so that others skilled in the art to which it appertains may apply the same.

Figure 2:
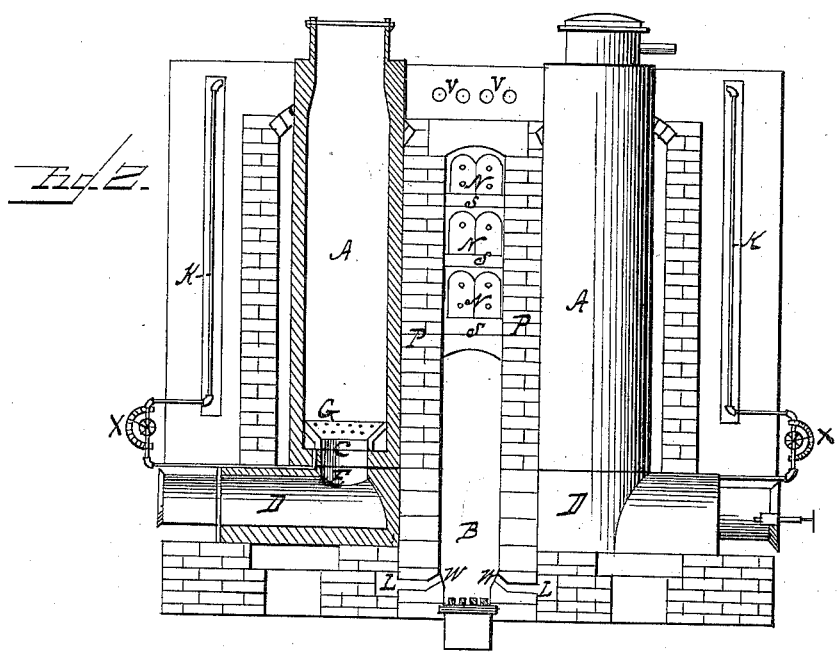

Figure 1 is a horizontal section of an oven or furnace and a series of vertical decomposing-retorts arranged therein. Fig. 2 is a vertical section of the same, showing one retort in section and one in elevation. Fig. 3 is a top view of the oven, the roof or crown and retorts being removed to show the arrangement of the pillars and arches. Fig. 4 is a vertical section of Fig. 3. Fig. 5 is a plan or top view of an arrangement wherein two of the decomposing-retorts are replaced by three carbureting-retorts. Fig. 6 is a horizontal section of a like arrangement of retorts. Fig. 7 is a view, partially in elevation and partly in section, of devices similar to those shown in our Patent No. 209,563, November 5, 1878, which may be used in conjunction with the decomposing-retorts, &c., shown in Figs. 1 and 2, if desired.

Like letters refer to like parts wherever they occur.

The outer walls of the furnace, which may be made of brick-work, are preferably constructed so as to form a rectangular oven or retort-chamber with parallel benches for the vertical retorts A A, which latter may be any number desired, but preferably from six to ten, (or three to five on a side.) Between the parallel benches is arranged the fire-chamber B, the walls of which are of fire-brick, one or more rows of brick just above the grate-bars being tuyere or perforated brick W, to provide air-channels, which communicate with the fire-chamber B and with an air channel or conduit, L, formed in the walls of the furnace around the fire-chamber, so that the air-supply will be thoroughly heated before reaching the fire-chamber. These perforated fire-bricks W can be readily replaced by others when worn or burned out. In the benches, next to the outer walls and at suitable intervals, are the flues M M, which deliver into main flues M', leading into the stack. The number of these flues may be regulated by the number of retorts, as the retorts occupy the space between the flues, as shown. In the outer walls are a second series of channels or flues, H, which accommodate the steam-pipes K, which lead from the superheaters to the retorts A. The steam-pipes K are provided with index-valves X X, to regulate the amount of steam admitted to the retorts A.

A indicates the vertical retorts, which are preferably of fire-clay and cylindrical, but may be of any desired form and material, and are provided with the usual top pieces, covers, and conduits. These retorts are open below, as at C, to communicate with the separable or independent base-pieces upon which they rest.

D indicates the horizontal base or mouth pieces, which are somewhat of the form of the usual D-retort, flattened above to support the vertical retort, and provided with an orifice or opening, E, corresponding to that, C, in the bottom of the vertical retort. This horizontal detachable base-piece is preferably of fire-clay, extends to the outer walls of the furnace or oven, and is provided with a mouth-piece and lid, which may be of any of the well-known forms. It will be noticed that the diameter of the opening C in the bottom of vertical retort A is such as to leave a shoulder or ledge, upon which is placed a flaring annular tile, G. This tile G is flaring and annular or funnel-shaped, so as to direct the débris from retort A into the base-piece D, from whence it can be readily removed; and when the tile is in position in the bottom of the retort A it forms a steam channel or chamber into which the steam-pipe K delivers, the tile being perforated with one-fourth-inch holes, so as to distribute the steam uniformly in retort A.

In order to facilitate the insertion and removal of tile G, we prefer to make it in two or more parts. The base-pieces D are supported by the benches before mentioned, being arranged at suitable intervals, with their mouth-pieces projecting from the oven-wall, and in turn support the vertical retorts A, (and communicate therewith,) as shown in Fig. 2.

On the parallel benches next to the fire-chamber B, and at intervals corresponding to the space between the retorts, are erected pillars or supports P to the height of the outer walls, and from the pillars to the outer walls, as well as from pillar to pillar, are sprung a series of arches, p, (see Fig. 3,) so that that portion of the crown of the oven inclosing each retort has its independent supports, and can be removed, to withdraw or replace the retort, without disturbing the rest of the crown or weakening the structure.

Extending from pillar to pillar over the fire-chamber B are a series of supports or shelves, s, of refractory material, on which are placed a set of independent superheaters, N N, which may be long fire-clay blocks with return-channels communicating with the steam-supply and with the steam-pipe K, as preferred, or may be of metal tubing incased in fire-clay, the essential feature of construction being such that they may be removed and renewed without seriously disturbing the main walls of the oven. If desired, additional super-heaters for steam may be provided by inserting a series of pipes, V V, of two or three inches in diameter in the crown of the oven, as shown in Fig. 2, as in such position they can be readily reached for repairs when required.

Where it is desirable to arrange both the decomposing-retorts and the carbureting-retorts in a single oven or furnace, we substitute for two or more of the decomposing-retorts A A (shown in Figs. 1 and 2) several vertical carbureting-retorts, a' a'', (shown in Figs. 5 and 6,) of a construction peculiarly adapted to obtain the object in view. These retorts a' a'' (of which three will suffice for works of the size chosen for illustration) are divided centrally and vertically by a diaphragm which extends from the top to within a short distance of the bottom of the retort, so as to leave a passage below, whereby the gases which descend on one side of the diaphragm may ascend on the other. One or more of said carbureting-retorts, a', are arranged at the end of the row of decomposing-retorts A, and connected therewith by pipes B', so that the water-gas from the retorts A will be delivered into the retort a' on one side of the central diaphragm at the top of the retort. At this point the gases are charged with hydrocarbons in the form of vapor or spray by means of a jet or rose nozzle, F, which projects into the retort a' on the same side of the central diaphragm. The end carbureting-retorts, a', of the series are connected by pipes B'' with a central carbureting-retort, $a''$, on one side of the central diaphragm, and from the other side of the diaphragm a pipe, D', conducts the gas to the place of storage or utilization. Where there is no objection to an independent oven or furnace for the carbureting-retorts, or it is desired to use horizontal retorts, the devices shown in Fig. 7 (which correspond to what is described in Harris's Patent No. 112,593, March 14, 1871, and Harris and Allen's Patent No. 209,563, November 5, 1878) may be employed, in which case the water-gas from vertical decomposing-retorts A is conducted into a vaporizer, $a$, surrounded by a steam-jacket, where they are supplied with naphtha, petroleum, or any suitable hydrocarbon, admitted to the vaporizer through pipe $c'$, and the mixed gas and vapors pass thence into the horizontal retorts H' H', through which they circulate, and are subjected to a high heat, which converts the whole into a fixed gas of great heating-power, but whose illuminating-power depends on the amount of hydrocarbon admitted through pipe $c'$. The oven in Fig. 7 is shown as containing four horizontal retorts, H' H', each retort divided by a diaphragm into two chambers, which communicate at the rear by an open passage, and these retorts are set in couples connected by a pipe, G', the upper retort of each couple connecting directly with the main by a stand-pipe, K', so that the gases from the decomposing-retorts A, charged with hydrocarbon vapors in the vaporizer, first enter the lower compartment in the lowest retort H', pass back therein through the diaphragm into the upper compartment, forward to pipe G', thence to the lower chamber of the upper retort, thence into stand-pipe K', and finally to the main.

It will be noted that in all the apparatus described and in all the figures the decomposing and carbureting retorts have been arranged and connected in duplicate series, so that either series may be operated independently of the other, or the two conjointly or alternately, according to the volume of gas desired; and it is also evident that by following the system specified and increasing the number of the respective retorts A, works of any desired capacity may be constructed. We have, however, found from practical experience that the best results are obtained where the number of retorts is limited, say, from six to ten.

As the Allen-Harris and kindred processes for manufacturing gas by decomposing water by means of highly-heated carbon, and afterward enriching the same by distilling with rich bituminous coals, petroleum, naphtha, &c., are now well known in the art of manufacturing gas, it is unnecessary here to more fully describe the operation of the devices than has been done in the foregoing description.

Having thus described the nature and advantages of our invention, what we claim, and desire to secure by Letters Patent, is—

1. In apparatus for the manufacture of gas, the combination, with a furnace having a retort-bench and fire-chamber, of a detachable horizontal base or mouth piece which rests upon the retort-bench and projects through the furnace-walls, and a detachable vertical retort supported by and communicating with the detachable horizontal base or mouth piece, substantially as and for the purposes specified.

2. In apparatus for the manufacture of gas, the combination, with a vertical retort having an opening in its bottom, of an annular flaring perforated detachable tile adapted to form a steam-channel in the bottom of the retort, substantially as and for the purposes specified.

3. In a furnace or oven having a single fire-chamber for the reception of several retorts, the combination of a series of independent pillars arranged in the oven and a series of independent arches extending from the pillars to the furnace-wall, substantially as and for the purposes specified.

4. In a furnace or oven for the manufacture of gas, a series of independent pillars arranged therein and provided with shelves or super-heater-supports, and a series of independent superheaters arranged on the pillar-supports and over the fire-chamber, substantially as and for the purposes specified.

5. The combination, with a furnace or oven and a series of vertical retorts arranged therein in parallel rows, of a fire-chamber arranged between the parallel rows of retorts, a series of independent pillars arranged opposite the intervals between the retorts, and detachable superheaters arranged between the parallel rows of retorts and supported by the independent pillars directly over the fire-chamber, substantially as and for the purposes specified.

6. In apparatus for the manufacture of gas, the combination, in a single furnace, of a series of independent vertical decomposing-retorts which deliver into a common conduit leading to the carbureting-retorts, and a series of independent vertical carbureting-retorts having vertical central diaphragms and spray-nozzles, the decomposing-retorts connected with each other and with the carbureting-retorts by a conduit which delivers into the latter at or near the spray-nozzle, substantially as and for the purposes specified.

7. In apparatus for the manufacture of gas, the combination of the vertical decomposing-retort, the detachable annular flaring perforate tile arranged in the retort to form a steam-chamber, and the superheated steam-pipe which delivers into the retort below the annular flaring perforate tile, and provided with the index-valve, substantially as and for the purposes specified.

GEORGE W. HARRIS.
A. L. ALLEN.

Witnesses:
JAMES M. HADDEN,
GOYN ADDISON TALMAGE.